United States Patent [19]
Emerson

[11] 3,903,947
[45] Sept. 9, 1975

[54] PUNCTURE SEALING MEANS FOR PNEUMATIC TIRES
[75] Inventor: Roy J. Emerson, Tallmadge, Ohio
[73] Assignee: The General Tire & Rubber Company, Akron, Ohio
[22] Filed: Sept. 19, 1974
[21] Appl. No.: 507,502

Related U.S. Application Data
[63] Continuation-in-part of Ser. No. 357,026, May 3, 1973, abandoned.

[52] U.S. Cl. .................. 152/347; 156/97; 156/115; 156/145; 161/166; 161/243; 161/256; 161/405
[51] Int. Cl.² ........................................ B60C 21/08
[58] Field of Search ........... 152/346, 347; 161/145, 161/166, 239, 240, 253-256, 243, 405; 156/90, 97, 115, 145

[56] References Cited
UNITED STATES PATENTS
2,438,965  4/1948  Dasher ........................... 161/405
2,493,047  1/1950  Waber ............................ 156/115
2,497,123  2/1950  Frolich ........................... 161/405
2,687,976  8/1954  Gerke ............................ 161/405
2,715,085  8/1955  Boger ............................ 161/405
2,765,018  2/1956  Connell .......................... 156/115
2,818,902  1/1958  Schultz .......................... 161/243
3,048,509  8/1962  Sweet et al. .................... 161/145

Primary Examiner—Drayton E. Hoffman

[57] ABSTRACT

An improved laminated puncture sealing strip for pneumatic tires is made up of one or more layers of sealing composition consisting essentially of a plasticized unvulcanized or very slightly vulcanized rubber stock, preferably EPDM plasticized with high viscosity paraffinic oils, each layer of sealing composition being contained between barrier layers of vulcanized rubber which is substantially non-swelling in the plasticizing oils whereby migration of any plasticizing oil from such sealing layer is prevented.

33 Claims, 4 Drawing Figures

PUNCTURE SEALING MEANS FOR PNEUMATIC TIRES

This application is a continuation-in-part of prior copending application Ser. No. 357,026, filed May 3, 1973, now abandoned.

BACKGROUND OF THE INVENTION

The use of laminated puncture sealing strips in pneumatic tires is old in the art. These strips generally comprise a plurality of superposed sealing composition layers composed of a soft, sticky, synthetic rubber sealing composition and separating and covering layers or sheets composed of a vulcanized rubber compound. Such a strip is affixed to the inside of a pneumatic tire generally over the area of road contact. Sealing strips are useful in stopping air leaks due to tire penetration by such instruments as nails or other sharp objects without stopping the vehicle.

Upon penetration by a nail through the puncture sealing strip, the soft, sticky, synthetic rubber in the sealing composition layer encapsulates the nail and prevents leakage of air through the nail hole. Sealing occurs upon penetration and continues either while the penetrating object is embedded in the tire or upon removal of the object at which time the soft, sticky, synthetic rubber sealing composition enters the hole and effectively seals it against escaping air.

A puncture sealing strip for pneumatic tires must meet a variety of additional requirements in order to be practical. The soft, sticky, synthetic rubber sealing composition should not flow when the tire is stationary or else the tire will become unbalanced and promote vibration in the vehicle. It should not lose its sealing ability over the life of the tire. In addition, it may be subjected to a second vulcanization heat cycle during retreading of the tire. A typical puncture sealing strip is fully illustrated and described in U.S. letters Pat. No. 3,048,509. Other references of interest include U.S. letters Pat. Nos. 2,039,401; 2,566,384; 2,657,729; 2,664,936; 2,739,639; 2,752,979; 2,756,801; 2,765,018; 2,802,505; 2,811,190; 2,905,220; 2,935,109; 3,042,098; and 3,090,416.

Prior art laminated puncture sealing strips suffer predominantly from loss of sealing ability with age. Intensive research has shown that this loss of sealing ability stems from increasing viscosity and hardening of the rubber in the sealing composition. This hardening stems from loss or migration of plasticizing materials from the sealing composition into the separating and covering layers and into the bulk of the tire and from progressive crosslinking of the synthetic rubber sealing polymer. Plasticizer migration occurs when a plasticized rubber compound is placed in contact with another compound that has either a lack of or lower concentration of plasticizer and is capable of being swelled by the plasticizer of the contacting composition. Progressive crosslinking occurs from reverse migration of curatives in the tire body and the separating and covering layers to the sealing composition and from oxidation. Both processes are accelerated by the heat generated from high speed tire use and/or repeated high temperature vulcanization cycles necessary in retreading operations.

The prior art has attempted to solve these problems by incorporating cure retarders and antioxidants in the sealing composition. Further efforts involve the use of slightly unsaturated or fully saturated rubbers in the sealing composition. None of these attempts appear to have solved the hardening problem, however, for present day puncture sealant strips in pneumatic tires undergo a severe loss of sealing ability with age.

SUMMARY OF THE INVENTION

In a laminated puncture sealing strip for pneumatic tires, comprising one or more superposed sealing layers composed of a soft, sticky, unvulcanized synthetic rubber sealing composition and separating and covering layers composed of a vulcanized rubber compound, this invention consists of the improvement comprising employing different types of rubbers in the sealing layers and the separating and covering layers having solubility characteristics sufficiently different to allow the rubber used in the sealing composition to be softened with a plasticizer that does not substantially swell the rubbers used in the separating and covering sheets.

In this invention different types of rubber are employed in the sealing layers and in the separating and covering layers. These different types of rubber have solubility characteristics sufficiently different to permit the rubber used in the sealing composition to be softened with a plasticizer that is essentially non-compatible and non-miscible with the rubbers used in the separating and covering layers. In particular, this invention employs in one manifestation ethylene-propylene-diene monomer rubbers, known by their ASTM designation as EPDM rubbers, in the sealing composition in combination with medium to high nitrile content rubbers in the separating and covering sheets. The EPDM rubber is almost fully saturated and therefore resistant to any curative effect of the vulcanization agents commonly used for highly unsaturated elastomers used in tires. The medium to high nitrile content rubber in the separating and covering layers is not susceptible to substantial swelling in the paraffinic oils used to plasticize the EPDM rubber.

The principal object of this invention is to provide an improved laminated puncture sealing strip for pneumatic tires that consistently seals tire punctures over a longer time than existing sealing strips. Another object is to provide such an improved strip by the use of a certain combination of materials in known structures rather than by a new structure. Another object of this invention is to provide a laminated puncture sealing strip for pneumatic tires that will effectively withstand repeated vulcanization operations without loss of sealing ability and that will not exhibit cold flow or other tire unbalancing phenomena during storage or non-use of said tires. These and other objects of the invention which are apparent from the description of the preferred embodiment are satisfied by this invention.

DESCRIPTION OF THE PREFERRED EMBODIMENTS

Figure 1:
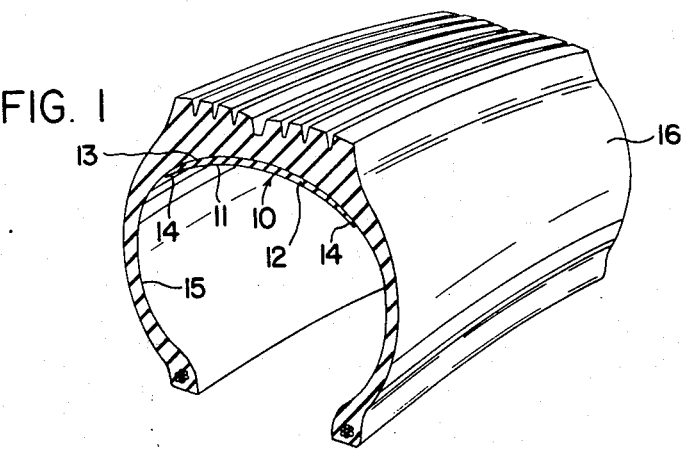
FIG. 1 is a fragmentary sectional perspective view of a tire embodying the invention.
Figure 2:
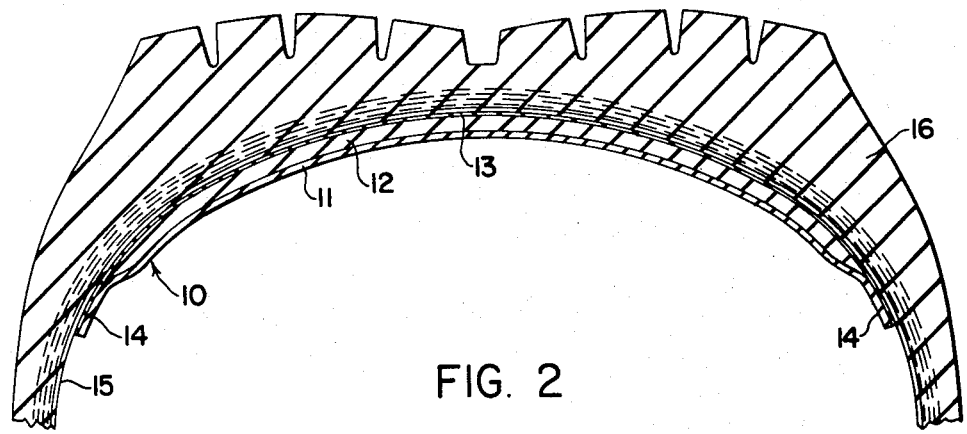
FIG. 2 is a fragmentary transverse section through the tread portion of the tire shown on an enlarged scale.

The most preferred rubber of this invention for employment in the sealing composition is an EPDM rubber which, by its nature, is highly saturated and therefore resistant to age-hardening through progressive crosslinking. The EPDM rubber may exhibit a very slight amount of crosslinking during curing of the tire due to migration of curatives from the covering layers or carcass or it may be purposely compounded to produce a very slight amount of crosslinking or thickened with fillers to enhance its resistance to flow under low shear stress and thus to prevent the tire from becoming unbalanced during service.

The rubber used in the sealing composition, noted above as preferably an EPDM rubber, is plasticized with sufficient oil, preferably a paraffinic oil, to lower its Mooney viscosity to between 10 to 30 to impart better sealability to the EPDM rubber. Although oil viscosity is not a big factor in this particular use, it is desirable to utilize a high viscosity oil to lower the oil's ability to migrate in the sealing layer.

Separating and/or covering layers termed "squeegee" layers are made of vulcanized rubber that is not substantially swollen by the plasticizing oil used in the sealing composition. Such vulcanized rubber should swell no more than about 20 percent, preferably no more than about 10 percent, in the plasticizing oil. Preferred are nitrile rubbers with medium to high acrylonitrile contents, e.g., at least 20 weight percent acrylonitrile, as they resist swelling in the paraffinic oils used to plasticize the rubber in the sealing composition.

Confining the soft, sticky, synthetic rubber sealing composition in thin layers between separating and covering layers or sheets to form a laminated strip substantially prevents low shear stress flow in the rubber sealing composition and concomitant damage or unbalancing from this flow. Of course, it also prevents the sealant layer from adhering to the bladder of a curing press during vulcanization.

It has been found desirable to incorporate the plasticizer, e.g., paraffinic oils, into the synthetic rubber of the sealing composition using a warm or hot internal mixer such as a banbury mixer in contrast to a cold mixer or mill. It appears that mixing is faster and the sealing composition is significantly improved with respect to sealing ability if the oil is introduced into the rubber using a warm or hot mixer, preferably at 200°F. or higher, in contrast to using a cold mixer, e.g. 160°F. or lower. Heating the oil to 250°F. also shortens the time for incorporation.

In contrast to prior art laminated sealing strips having five or more layers as shown in U.S. Pat. No. 3,048,509, this invention is operable when only three layers are utilized, i.e., one layer of sealing composition interposed between two covering sheets or squeegees. The thicknesses of the sealing composition layers and the separating and covering sheets may vary over a wide range. The sealing composition layers may be as thin as 30 mils in original thickness, preferably about 50 to 100 mils, whereas the covering and separating sheets or layers (squeegees) may be as thin as 15 mils in original thickness. Both types of layers will be considerably thinner in a cured tire. For example, the green tire is built in one configuration; then expanded and cured in another configuration so that the layers may be reduced in thickness as much as 50 percent.

The laminated puncture sealing strip of this invention can be put into an unvulcanized tire and the separating and covering sheets vulcanized during the curing or vulcanization of the tire in the mold or the strip can be assembled and vulcanized and then subsequently cemented into a cured tire carcass and bonded in place during a heat cycle as in recapping. Any reasonable method of construction, including these two, results in operable performance of the sealing strip.

Figure 4:
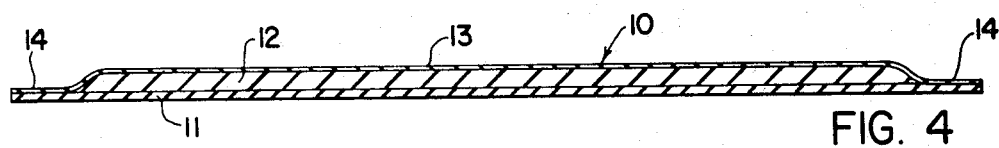
FIG. 4 is a section taken along the line indicated at 4—4 of FIG. 3 and shown on an enlarged scale.
Figure 3:
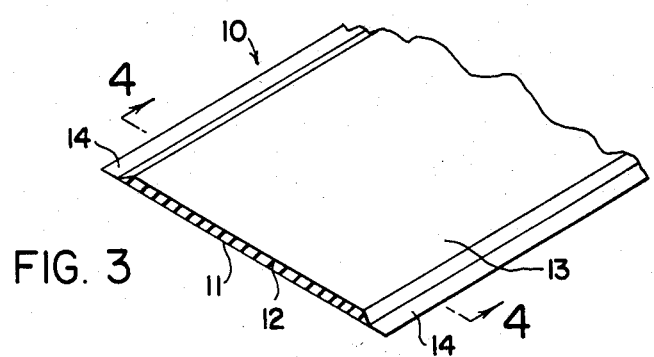
FIG. 3 is a perspective view of a fragment of the sealing strip of this invention.

In the accompanying drawings a sealing strip 10 is shown which has a covering or squeegee sheet 11 of a vulcanized synthetic rubber, a narrower and thicker layer 12 of the soft, sticky, synthetic rubber sealing composition of this invention and a second squeegee sheet 13 of vulcanized synthetic rubber which has edge portions 14 united with the sheet 11 beyond opposite side edges of layer 12. In a typical three-layer laminated puncture sealing strip one squeegee or cover sheet 11 is 30 mils in thickness, the sealing composition layer 12 is 70 mils in thickness and the second squeegee or sheet 13 is 15 mils in thickness. While the squeegee sheets 11 and 13 can have the same thickness, one sheet is preferably thicker than the other. For example, the 30 mil sheet can be prepared by laminating two 15 mil sheets thereby avoiding holes through which sealant might escape to contact the curing bladder. Such a sealing strip 10 is attached to the inner liner 15 of a tire 16 such that the thinner squeegee sheet 13 is attached to the tire inner liner 15 and the thicker squeegee sheet 11 is exposed to the air in the tire 16. A typical five-layer laminated puncture sealing strip of this invention would comprise a top squeegee or cover sheet 30 mils in thickness, an upper sealant layer 70 mils in thickness, a separating or middle squeegee sheet 15 mils in thickness, a lower layer of rubber sealing composition 70 mils in thickness, and a bottom cover or squeegee sheet 15 mils in thickness. Such a sealing strip is illustrated in FIG. 4 of U.S. Pat. No. 3,048,509. While such a five-layer sealing strip can be used, the three-layer strip is completely satisfactory as shown in the test results set forth below. When a five-layer sealing strip is attached to a tire inner liner, the thinnest external squeegee sheet of said strip is attached to said tire inner liner. In a further modification for radial tire construction, sealing strip 10 can be disposed or positioned in the crown area of the tire between tire inner liner 15 and the first or innermost carcass ply of the tire.

The synthetic rubber in the sealing composition layer preferably consists essentially of an EPDM rubber. There is a variety of EPDM rubber stocks available commercially and identified generically as such. The physical characteristics of the rubber stock employed in the sealing composition must be such that the sealing composition is mobile enough to seal a puncture in a squeegee layer without being so mobile as to flow out through such a puncture or to flow within the sealing strip when the containing tire is at rest. Generally, EPDM stocks having Mooney viscosities (ML 1+4 at 250°F.) of about 40 to 90 are suitable.

Some EPDM stocks exhibit undesirable flow characteristics under low shear stress. Such low shear flow would, without further treatment, cause unbalancing of the tire. A very slight vulcanization or crosslinking of the EPDM stock corrects this low shear flow without impairing sealing ability. For example in a laboratory test, one commercial EPDM stock (ML 1+4 at 250°F. of 70) was compounded with 0.3 phr (parts by weight per hundred parts by weight of the hydrocarbon rubber) sulfur, 5 phr ZnO, 1.5 phr tetramethyl thiuram monosulfide and 0.5 phr mercapto benzothiazole and heated for sixty minutes at 330°F. to achieve the necessary slight crosslinking. Similar lab results are produced using 0.4 phr of dicumyl peroxide with a heat cycle of 45 minutes at 330°F. or in some EPDM rubbers 5 phr of a commercial bromomethyl alkylated phenol-formaldehyde resin vulcanizing agent (s.g. at 25°C. = 1–1.1; m.p. (capillary method) = 135°–150°F.) and 5 phr ZnO with a heat cycle of sixty minutes at 330°F. Another crosslinking system based upon quinone dioxime and lead peroxide will also produce successful results in some varieties of EPDM rubber when used at proper levels. Not all EPDM rubbers are vulcanizable by the latter two crosslinking systems. The results depend on the chemical structure of the unsaturated portions of the rubber molecules.

Thus far, no EPDM polymer has been found to be satisfactory alone so that other compound ingredients are presently necessary in the sealing composition. The total amount of these other ingredients can vary from 10 phr to 200 phr. These ingredients comprise solids and liquids that are incorporated into the EPDM rubber using practices well known in the rubber art. Examples of such possible additional ingredients include plasticizers, antioxidants, softeners, processing aids, dispersing agents, tackifiers, coarse carbon blacks or organic or inorganic fillers, inorganic and organic colorants, vulcanizing systems to reduce cold flow, adhesives and bonding agents.

A plasticizing ingredient such as a hydrocarbon oil is incorporated into the EPDM stock. As is generally known, higher viscosity oils tend to migrate through rubber compounds slower than oils of lower viscosity. Preferred in this invention are high viscosity paraffinic oils, e.g., viscosity at 100°F. of 2775 SUS and at 210°F. of 155 SUS. However, other oils can be used with such viscosities as 980 SUS at 100°F. and 85 SUS at 210°F.; 515 SUS at 100°F. and 63 SUS at 210°F.; or 505 SUS at 100°F. and 57.3 SUS at 210°F. These useable oils can have varying aromatic, paraffinic, and naphthenic fractions. For example, there are presently a number of suitable commercially-available oils which have from 2 to 5 weight percent aromatic, 29 to 43 weight percent naphthenic and 55 to 67 weight percent paraffinic fractions and which work well, but others of this general nature are operative in selected systems. Generally, sufficient oil is added to reduce the compound Mooney viscosity of the EPDM to between 10–15. Such oil amount usually varies between 100 and 180 phr.

Conventional crosslinking retarders normally used in prior art puncture sealing compositions can be eliminated without adverse effect upon the performance of the strip of this invention in sealing against tire punctures.

A typical recipe for a preferred sealing composition of this invention comprises 100 parts by weight of an EPDM rubber, 100 to 180 parts, preferably 120 to 140 parts, by weight per hundred parts of rubber of a paraffinic oil, 10 to 50, preferably 15 to 30, parts by weight per hundred parts rubber of a coarse particle size carbon black, 2 to 8, preferably about 5, parts by weight per hundred parts rubber of a heat stabilizer such as zinc oxide and 1 to 3, preferably about 2, parts by weight per hundred parts rubber of an antioxidant such as the commercial high temperature condensation product of acetone and diphenylamine.

The separating and covering layers or squeegee sheets serve two major functions. The first is mechanical in that they prevent the uncured or slightly cured sealant from sticking to the curing bladder used in vulcanizing the green tire. The second function is to prevent migration of plasticizer oils out of the sealant layer. It is preferred in this invention to utilize nitrile rubbers having medium to high acrylonitrile contents of at least 20 weight percent, more preferably at least 30 weight percent acrylonitrile, in the squeegee sheets. Typical suitable nitrile rubbers generally contain about 30 to 35 weight percent acrylonitrile units and range in Mooney viscosity (ML1+4 at 212°F.) from about 30 to about 60. Nitrile rubbers are widely known as extremely resistant to paraffinic oil. Therefore, the use of nitrile rubber in the separating and covering sheets effectively prevents the paraffinic oil employed in the synthetic rubber sealing composition from migrating therefrom. It is preferred that the nitrile rubber comprise at least about one-half of the total rubber content of the separating and covering sheets. In place of part or all of the nitrile rubber there can be used a rubbery vulcanizable copolymer of propylene oxide and allyl glycidyl ether containing from about 0.5 to 10 percent by weight of copolymerized allyl glycidyl ether or similar propylene oxide rubber.

Natural rubber or synthetic cis-polyisoprene, or other polymers such as some of the polychloroprenes and trans polypentenamers, could be added to the squeegee sheet composition to provide tack and improved adhesive qualities in building the laminate and to improve the bond between the covering sheet and the adjacent surface of the tire. The natural rubber or cis-polyisoprene in the separating and covering sheet composition can comprise up to about one-half the total rubber content of said composition.

While tackifiers or other adhesive promoters may not be necessary in some squeegee compositions, tackifying resins can be used in place of natural rubber and other polymers with certain advantages such as improved tear strength and better migration barrier properties. It is preferable that such tackifiers be used in amounts up to about 20 phr. Typical tackifiers include a commercial thermoplastic oil-soluble phenolic resin tackifier having a softening temperature (Ball & Ring) of 100° to 110°C., s.g. at 25°C. of 1.02 to 1.12 and solubility in vegetable oils, aromatics and ketones, and a commercial terpene-modified alkyl phenolic resin tackifier having a softening temperature (Ball & Ring) of 125° to 145°C., s.g. at 25°C. of 1.02 to 1.04, an acid number of 75 to 105 and solubility in toluene.

Since the separating and covering sheet compositions are vulcanized, they must necessarily contain ingredients for effecting vulcanization along with a number of other additives to get the desired properties. The total amount of these materials may range from 50 to 150 parts by weight per hundred parts by weight of total rubber in the composition. Examples of these ingredients and other additives include carbon black, zinc oxide, stearic acid, accelerators, anti-oxidants, fillers and the like. A typical squeegee sheet formulation of this invention comprises 70 to 100 parts by weight of a medium to high nitrile hydrocarbon rubber, 0 to 30 parts by weight of natural rubber, 20 to 100, preferably 50 to 70, phr of carbon black and other filler, 0 to 20 phr of tackifier, 0.8 to 1.6 phr of sulfur and 1 to 10 phr of stabilizers, accelerators, anti-oxidants and other additives. The rubbers and other ingredients are combined using conventional rubber mixing and blending practices. After the laminate is formed, the covering layers are vulcanized during the cure cycle of the tire.

While the preferred system described above and illustrated in the Examples below employs an EPDM rubber-based sealant and nitrile rubber-based squeegee sheets, other corresponding materials can be employed. For example, butyl rubber or polyisobutylene can be used instead of EPDM rubber in the sealant. However, with polyisobutylene cold flow would be more of a problem, primarily because the lack of unsaturation would make more difficult and possibly preclude the controlled partial cure technique recommended for use with the EPDM rubber-based sealant. In the sealant, blends of polymers may be used instead of a single polymer such as a curable blend of butyl or chlorinated butyl with a rubbery polyisobutylene or a blend of a rubbery ethylene-propylene copolymer and 10 to 20 percent by weight of a rubbery butadiene-styrene copolymer (e.g. SBR, about 23.5 percent bound styrene) or natural rubber or cis-polyisoprene or other highly unsaturated rubber. Curatives can be added to the blends to control cold flow and improve adhesion to the squeegee sheets. With regard to the squeegee stock polychloroprene rubber can be used instead of the defined nitrile rubber stock. However, polychloroprene rubber would be expected to swell more than the defined nitrile rubber from the hydrocarbon oil employed in the sealant composition and therefore would not be as good a barrier to oil migration.

Other systems come within the general concept of this invention whenever any plasticized sealant composition is confined by squeegee sheets in which the rubber in the squeegee forms a barrier to migration of the plasticizer. For example, the sealant composition can be based on a copolymer of propylene oxide (PO) and allyl glycidyl ether (AGE) in a molar ratio ranging from about 95:5 to 99.5:0.5, preferably in the range of 96:4 to 99:1. One specific commercially-available propylene oxide-allyl glycidyl ether copolymer has a PO/AGE mole ratio of 97:3, a Mooney viscosity (ML1+4 at 212°F.) of 84 and an intrinsic viscosity in benzene of 5.87. Such PO copolymer can be plasticized with a polyether such as a liquid propylene oxide polymer which is typically hydroxyl-terminated, but such functionality is not necessary for the purposes of this invention and which are commercially available in molecular weight ranges up to 6000, but higher molecular weight polyethers can be employed, e.g. up to 12,000. With such sealant compositions the squeegee layer can be based on a butyl rubber or chlorinated butyl rubber or a blend containing one or both as the major component which, when cured, acts as a barrier to the liquid propylene oxide polymer. This is of particular value because many tire inner liners contain a large fraction of butyl rubber or chlorinated butyl rubber so that a laminated puncture sealing strip with butyl rubber squeegees can also serve as a tire inner liner if the squeegee is large enough to cover the entire inner surface of the tire. Even when an inner liner is used, the squeegee serves as an auxiliary inner liner without any adhesion problem when the squeegee and primary inner liner stocks are compatible. Note that cured butyl rubber as a squeegee composition is a barrier to polyether plasticizer migration in one system, but uncured butyl rubber can be extended with a hydrocarbon oil to form the base of a sealant composition in another system.

Instead of a simple butyl rubber squeegee as described it is preferable to use a blend such as 70 parts by weight of a chlorobutyl polymer and 30 parts by weight of natural rubber to improve adhesion of the squeegee to the tire carcass. Alternatively, the butyl rubber in the squeegee stock can be modified with a curing resin such as a commercially available bromomethyl alkylated phenolformaldehyde resin vulcanizing agent with a specific gravity in the range of 1 to 1.1 and a melting point (capillary method) in the range of 135° to 150°F. As an alternative to the PO-AGE sealant with a polyether plasticizer, a polyacrylate can be used with a suitable polyether plasticizer such as a low molecular weight aliphatic polyether, e.g., butyl ethers of di- or tri-ethylene glycol, butyl Carbitol, butyl Cellosolve, or other polar plasticizer.

The following examples are illustrative of the best presently known modes of practicing this invention but are not intended to limit the scope of this invention the scope of which is properly delineated in the appended claims. Unless otherwise stated, all quantitative measurements are by weight.

EXAMPLES

The laminated puncture sealing strips employed in these examples were prepared from the following components.

One squeegee stock A was prepared using 100 parts of a commercial nitrile rubber stock comprising 32 percent acrylonitrile and the balance butadiene and having a Mooney viscosity (ML1+4 at 212°F.) of 30, 50 phr of semireinforcing furnace carbon black, 20 phr of medium thermal carbon black (nonreinforcing filler), 10 phr of a commerical tackifier for nitrile elastomers consisting of a thermoplastic oil-soluble phenolic resin having a softening temperature (Ball & Ring) of 100° to 110°C. and s.g. at 25°C. of 1.02 to 1.12, 5 phr of zinc oxide vulcanization activator, 2 phr of 2-mercaptobenzothiazole disulfide, 0.6 phr of tetramethyl thiuram monosulfide and 0.6 phr of a polymeric sulfur which is insoluble until heated for vulcanization.

Another squeegee stock B was identical to A except that twice as much (1.2 phr) polymeric sulfur was used and the rubber stock was a commerical nitrile rubber stock comprising a copolymer of butadiene with 30 to 35 percent acrylonitrile and having a Mooney viscosity (ML1+4 at 212°F.) of 45 to 60.

A third squeegee stock C was identical to A except that twice as much (1.2 phr) polymeric sulfur was used and the 10 phr of tackifier was replaced by a combination of 7 phr of the same tackifier plus 7 phr of a commerical toluene-soluble terpene-modified alkyl phenolic tackifier having a melting point (capillary tube method) of 115° to 135°C. and s.g. at 25°C. of 1.02 to 1.04. Also 2 phr N-cyclohexyl-2-benzothiazylsulfenamide was substituted for the 2-mercaptobenzothiazole disulfide.

All the sealant compositions D, E, F, G, H and J were uniform mixtures of 100 parts of a commercial EPDM polymer having a Mooney viscosity (ML1+4 at 250°F.) of 70, from 100 to 140 parts per hundred parts of rubber polymer (phr) of a commercial hydrocarbon oil (SUS at 100°F. of 2775; SUS at 210°F. of 155) in which 67 to 68 percent of the carbon atoms are paraffinic, 28 to 29 percent of the carbon atoms are naphthenic and the balance of the carbon atoms are aromatic, 15 to 45 parts of a commercial medium thermal non-reinforcing carbon black filler, 5 parts of zinc oxide and 2 parts of a commercial antioxidant consisting of a high temperature condensation product of acetone and diphenylamine as follows:

| Sealant composition | Amount (phr) | |
|---|---|---|
| | Oil extender | Carbon black |
| D | 100 | 15 |
| E | 120 | 15 |
| F | 120 | 30 |
| G | 140 | 15 |
| H | 140 | 30 |
| J | 140 | 45 |

For testing purposes a modified Warburg test previously used to test laminated puncture sealing strips was found to be insufficiently sensitive. Therefore, a patch test was designed in which (1) three-layer 6 inches × 8 inches laminated strips were constructed with 0.070 inch or 70 mil sealant layer between a 30 mil squeegee layer and a 15 mil squeegee layer; (2) several such patches were bonded with a bromobutyl cement to the cured inner liners of standard tires to be recapped, the recapping bladder being used to supply sufficient pressure to insure adequate cured adhesion of the patches to each tire inner liner; (3) the resulting assemblies were cured under recapping conditions, i.e. 60 minutes at 300°F.; (4) the test tires were mounted on rims and inflated to 24 psig; (5) six-penny nails were used to puncture each patch in at least three places; (6) the nails were removed with a slight twist; and (7) leaks were detected using an air pressure gauge and a soap solution.

As stated above, for the initial tests the laminated 6 inches × 8 inches patches were made by cold pressing in separate frame molds a 15 mil thick squeegee, a 30 mil thick squeegee and a 70 mil thick sealant layer, assembling the layers in the uncured state and curing the patches at 300°F. for about 60 minutes after adhesion to the inner liner of a tire or tire carcass. Test results are shown in Table I. Subsequent tests were made using laminated strips in which 15 mil squeegee strips and sealant strips of various thicknesses were calendered, two 15 mil squeegee strips were stacked to form a 30 mil squeegee strip, and these strips were laminated, such strips being tested in new bias-belted tires. The results are shown in Table II.

Table I

| Squeegee stock | Sealant stock | Sealant thickness (mils) | Soap solution test | Appearance of nail surface | 24 hr. Pressure loss (psig) |
|---|---|---|---|---|---|
| A | D | 70 | very slow leak | grainy smear | 1 |
| A | E | 70 | immediate seal | uniform smear | 0 |
| A | F | 70 | " | " | 0 |
| A | G | 70 | " | " | 0 |
| A | H | 70 | " | " | 0 |
| A | J | 70 | " | " | 0 |

Table II

| Assembly | Squeegee stock | Sealant stock | Original Sealant thickness (mils) |
|---|---|---|---|
| 1. | A | E | 50 |
| 2. | A | E | 60 |
| 3. | A | E | 70 |
| 4. | A | E | 80 |
| 5. | B | E | 50 |
| 6. | B | E | 60 |
| 7. | B | E | 70 |

Table II-continued

| Assembly | Squeegee stock | Sealant stock | Original Sealant thickness (mils) |
|---|---|---|---|
| 8. | B | E | 80 |

In every case there was immediate seal of the puncture; the sixpenny nails were coated with a uniform smear of sealant; and no air losses were detected by either soap solution or pressure gauge techniques.

It was found from subsequent tests that both of the 50 mil sealant assemblies (numbers 1 and 5) immediately sealed punctures from 16-penny nails (5/32 inch diameter).

Sixpenny nail punctures caused no detectable leaks in any of the tires in Table II in dynamic tests in G78–15 tires under 950 lbs. radial load and 24 psig. initial inflation pressure which had been run at 60 miles per hour for 60 minutes against a 24-inch diameter pulley wheel.

The same dynamic test was run using a laminate of squeegee stock A (FIG. 4, layer 11 0.030 inch thickness, layer 13 0.015 inch thickness) with an 80 mil layer of sealant E (tire No. 4). The test was run with four sixpenny nails in the tire. Two of these nails were removed while the tire was hot, and two after it had cooled. Only one of the two removed under each condition sealed, and one each did not, suggesting the possibility of a permanent set in the tire carcass. Subsequent 3-day 160-mile road tests with sixpenny nails in same type of tires in which the sealing strips has varying thicknesses of sealant and in which some nails were pulled after 75 miles while the remainder were pulled after 160 miles showed that where immediate sealing did not take place, those punctures sealed after an additional two to three miles of driving with minimal air loss. Squeegee stock C has the advantage of excellent retention of building tack because no solid compounding ingredients crystallized on its surface during storage and was used successfully in subsequent tests.

What is claimed is:

1. In a laminated puncture sealing strip for pneumatic tires, comprising one or more sealing composition layers of soft, sticky synthetic rubber encapsulated between separating and covering sheets of a vulcanized rubber compound, the improvement comprising employing in said sealing layers and in said separating and covering sheets different types of rubbers having solubility characteristics sufficiently different to allow the rubber used in said sealing composition to be softened with a plasticizer that does not substantially swell the rubber used in said separating and covering sheets.

2. The improvement of claim 1 wherein said rubber in said sealing layers comprises a rubber plasticized with a paraffinic oil and said rubber in said separating and covering sheets comprises a rubber which does not swell substantially in said hydrocarbon oil.

3. The improvement of claim 2 wherein said plasticized rubber is an ethylene-propylene-diene-monomer rubber.

4. The improvement of claim 3 wherein said plasticized rubber is unvulcanized.

5. The improvement of claim 3 wherein said plasticized rubber is slightly vulcanized.

6. The improvement of claim 3 wherein said rubber in said separating and covering sheets is a nitrile rubber in which the acrylonitrile units comprise at least 20 weight percent of the total nitrile rubber polymer and said oil contains no more than 5 weight percent aromatic fractions.

7. The improvement of claim 1 wherein said rubber in said sealing layers consists of a rubber plasticized with a polyether and said rubber in said separating and covering sheets consists of a rubber which does not swell substantially in said polyether.

8. The improvement of claim 2 wherein said rubber in said separating and covering sheets includes natural rubber.

9. A tire containing adhered to the inner surface thereof a sealing strip in accordance with claim 1.

10. The improvement of claim 1 wherein the rubber in said sealing layers is resistant to the curative effect of the vulcanization agents in the rubber in said separating and covering sheets.

11. The improvement of claim 10 wherein said rubber in said sealing layers consists essentially of butyl rubber.

12. The improvement of claim 7 wherein said plasticized rubber is a copolymer of propylene oxide and allyl glycidyl ether in a molar ratio ranging from about 95:5 to 99.5:0.5.

13. The improvement of claim 12 wherein said rubber in said separating and covering sheets is selected from the class consisting of butyl rubber, chlorinated butyl rubber, blends thereof and at most minor amounts of natural rubber.

14. The improvement of claim 7 wherein said plasticized rubber is a polyacrylate.

15. The improvement of claim 1 wherein the rubber in said separating and covering sheets comprises a blend of different rubbery polymers.

16. The improvement of claim 1 wherein the rubber in said sealing layers comprises a blend of different rubbery polymers.

17. The improvement of claim 1 wherein the rubbers in said separating and covering sheets and in said sealing layers comprise a blend of different rubbery polymers.

18. A pneumatic tire containing adhered to the inner surface thereof a laminated puncture sealing strip comprising one or more sealing composition layers of soft, sticky synthetic rubber encapsulated between separating and covering sheets of a vulcanized rubber compound, said sealing layers and said separating and covering sheets containing different types of rubbers having solubility characteristics sufficiently different to allow the rubber used in said sealing composition to be softened with a plasticizer that does not substantially swell the rubber used in said separating and covering sheets.

19. The pneumatic tire of claim 18 wherein said rubber in said sealing layers comprises a rubber plasticized with a paraffinic oil and said rubber in said separating and covering sheets comprises a rubber which does not swell substantially in said hydrocarbon oil.

20. The pneumatic tire of claim 19 wherein said plasticized rubber is an ethylene-propylene-diene-monomer rubber.

21. The pneumatic tire of claim 20 wherein said plasticized rubber is unvulcanized.

22. The pneumatic tire of claim 20 wherein said plasticized rubber is slightly vulcanized.

23. The pneumatic tire of claim 20 wherein said rubber in said separating and covering sheets is a nitrile rubber in which the acrylonitrile units comprise at least 20 weight percent of the total nitrile rubber polymer and said oil contains no more than 5 weight percent aromatic fractions.

24. The pneumatic tire of claim 18 wherein said rubber in said sealing layers consists of a rubber plasticized with a polyether and said rubber in said separating and covering sheets consists of a rubber which does not swell substantially in said polyether.

25. The pneumatic tire of claim 19 wherein said rubber in said separating and covering sheets includes natural rubber.

26. The pneumatic tire of claim 18 wherein the rubber in said sealing layers is resistant to the curative effect of the vulcanization agents in the rubber in said separating and covering sheets.

27. The pneumatic tire of claim 26 wherein said rubber in said sealing layers consists essentially of butyl rubber.

28. The pneumatic tire of claim 24 wherein said plasticized rubber is a copolymer of propylene oxide and allyl glycidyl ether in a molar ratio ranging from about 95:5 to 99.5:0.5.

29. The pneumatic tire of claim 28 wherein said rubber in said separating and covering sheets is selected from the class consisting of butyl rubber, chlorinated butyl rubber, blends thereof and at most minor amounts of natural rubber.

30. The pneumatic tire of claim 24 wherein said plasticized rubber is a polyacrylate.

31. The pneumatic tire of claim 18 wherein the rubber in said separating and covering sheets comprises a blend of different rubbery polymers.

32. The pneumatic tire of claim 18 wherein the rubber in said sealing layers comprises a blend of different rubbery polymers.

33. The pneumatic tire of claim 18 wherein the rubbers in said separating and covering sheets and in said sealing layers comprise each a blend of different rubbery polymers.

* * * * *